June 3, 1969  H. E. GOLDBERG  3,447,875
TEMPERATURE COMPENSATING REFRACTOMETERS
Filed June 21, 1965

INVENTOR.
HERBERT E. GOLDBERG
BY Stanley J. Yarnes
ATTORNEY

United States Patent Office 3,447,875
Patented June 3, 1969

3,447,875
TEMPERATURE COMPENSATING REFRACTOMETERS
Herbert E. Goldberg, Keene, N.H., assignor to American Optical Company, Southbridge, Mass., a voluntary association of Massachusetts
Filed June 21, 1965, Ser. No. 465,598
Int. Cl. G01n 21/46
U.S. Cl. 356—135         16 Claims

ABSTRACT OF THE DISCLOSURE

A temperature compensating refractometer which indicates the light-refracting properties of test substances on a scale in an optical system by directing light transmitted through the substances to points of focus at an image plane adjacent to the scale. The effect of changes in temperature of the test substances tending to alter the position of the points of focus at the image plane and the corresponding indication thereof on the scale is compensated for by temperature-responsive actuator means for producing scale readings which are independent of temperature. The actuator adjusts the scale or adjacent components of the system bidirectionally in the system in accordance with temperature changes substantially without causing relative displacement of the aforesaid points of focus.

---

This invention relates to refractometers and similar measuring instruments, particularly the type which is used in laboratory work, and in the chemical and process industries for the purpose of measuring or controlling the composition or concentration of liquid substances or solutions.

Such instruments are often based on the measurement of the so-called critical angle of total reflection, in which the position of a boundary line dividing a field of view into a bright and a dark portion is observed against a fixed scale or mark. In other cases, particularly in continuously reading instruments, the spectrometer type of refractometer is used. Although the invention will be described mainly as it is used in the total reflection type of instrument, it is understood that it can be used in connection with either type.

While the physical quantity measured by refractometers is the refractive index of the substance under test, it is often convenient to calibrate the scales or controls of the instrument in units which are of more immediate practical value to the user such as, for instance, percent of sugar, specific weight, iodine number, the calibration being based on standard tables showing the relationship between refractive index and the quantity desired.

Because the thermal expansion of all liquids is substantial, their actual index of refraction and thus the result of the measurement change with temperature, and such scale calibrations are thus valid only over narrow ranges of temperature. For instance, it has been found that a refractometer scale which has been calibrated to read a 10% sugar solution correctly at 68° F., will read the same solution as 9.5% if the temperature rises to 78° F. Since a change of concentration of as little as 1/10% is often economically significant in the process industries, it is obvious that the temperature of the sample used for the measurement must be known within a degree F. or so, and that corrections must be applied to the refractometer reading whenever the temperature deviates from normal by that amount.

So-called differential refractometers have been designed where the index of the product under test is compared to that of a standard sample of the same or a similar material, both being held at the same temperature. The error is eliminated by this procedure, but the use of the instrument is restricted to a narrow range of products.

It has also been proposed to use mechanical means for correcting the temperature error of a refractometer reading, for instance, by moving the refractometer scale in its own plane, up and down, either manually or by some temperature responsive actuator. However, the movement required to compensate for change of refractive index with change of temperature depends on the refractive index to be measured, and hence varies over the length of the scale. A prior knowledge of the exact nature of the substance to be measured is thus required to determine the distance by which the scale must be moved per degree of temperature change. This may be an acceptable method for control instruments used to supervise a definite product. The system would not, however, function in laboratory instrumetns where substances of widely varying characteristics must be measured, such as aqueous sugar solutions ranging from 0% to 80% concentration.

It has been suggested to solve the problem by moving the scale in its own plane, but in a transverse rather than longitudinal direction and by using a scale pattern designed to expand transversely as illustrated in FIGURE 1a. Different portions of the pattern are brought over a reading area R–R', depending on the temperature which is marked on the base line of the figure. The reading of the instrument may thus be rendered completely independent of temperature at every point of the scale.

It has also been suggested to arrange the scale diagonally as shown in FIGURE 1b and mount the scale assembly 1 on an arm 2, arranged to swing about a pivot 3 in response to temperature changes. The geometry of the figure shows that for a given angle of rotation the 40% line of the scale, being located further from the point of rotation, will move further in a vertical direction than the 0% line, for instance. Temperature correction may be achieved at every point by arranging the graduations along a curved path as shown. The inertia forces and friction losses are large for both the transversely moving and the swinging scale systems. Temperature responsive actuators of practical size are not sufficiently powerful to achieve the required mechanical displacements without error from friction or vibration.

Neither solution was found to be practical in commercial use.

It is thus an object of the present invention to provide a novel, simple and reliable means to render the readings of a refractometer substantially independent of temperature over all ranges of temperature and refractive index normally encountered in laboratory or industrial use.

It is another object of the invention to provide structures and arrangements of parts which will assure satisfactory performance of the device under severe operating conditions and without need for maintenance or adjustment.

Other objects of the invention, the principle of a device according to the invention, and detailed examples of it are described in the following specification and drawings, in which.

Figure 1A:
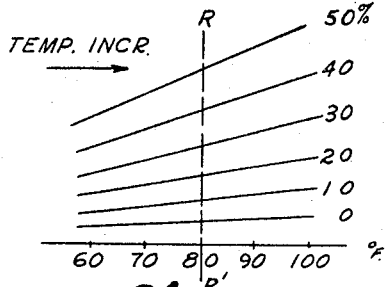
FIGURES 1a and 1b illustrate temperature compensators as heretofore known.
Figure 1B:
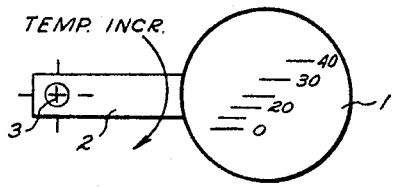
Figure 2A:
FIGURE 2a is a schematic cross-sectional view of a temperature compensated refractometer according to the invention.

Turning now to FIGURE 2a, let it be assumed that areas 4 and 5 of a measuring prism 6 are covered with samples to be investigated such as sucrose solutions, for instance, of 45% and 0% strength respectively. Light incident upon the samples will produce collimated bundles of light represented by chief rays 7 and 8. These rays are shown after having been refracted to the so-called critical angles of total refraction. They are focused by an objective lens 9 to image points 10 and 11, respectively. A reticle 12 such as a scale is positioned in the image plane, or near to it. A suitable lens assembly 13, 14 serves as a field lens. The field lens is shown as being composed of a positive element 13 and a negative element 14 for reasons explained further on in this specification, although this is not always necessary. The scale is held by a temperature responsive bi-metallic blade 18. The scale divisions may be provided on one side of the negative component 14, or on a separate substrate as shown. The position of the image points on the scale is a measure of the refractive indices of the solutions on areas 4 and 5, and is observed through an eye lens 15. If the scale is not positioned exactly in the image plane, the reading will be represented by the intersection of the chief rays with the scale pattern.

In practice only one solution may be present at one time, but if several solutions are present simultaneously, the well-known refractometer boundary lines are visible at both the 0% and 45% marks of the scale. The shadows are of lower than usual contrast but are sufficiently visible nevertheless. For the purpose of the following discussion, the term "optical image" will mean a pattern consisting of two or more boundary lines formed by the objective lens if several substances are placed on the measuring prism, either simultaneously or successively.

If the temperture of the sucrose solutions on areas 4 and 5 increases, their respective refractive indices will decrease, and chief rays 7 and 8 will rotate clockwise, but at different rates. Image points 10 and 11 will move correspondingly lower on scale 12. To compensate for the movement of the image points under the effect of temperature changes, it will, therefore, be necessary to move the 0% and 45% graduations of the scale in a downward direction, but by different distances. A typical uncompensated hand refractometer may have the following characteristics:

Range: 0–45 percent sucrose
Objective focal length: 50 mm.
Size of 0–1 percent scale division: .19 mm.
Size of 44–45 percent scale division: .36 mm.
Temperature change: +20° F. (from 70° F. to 90° F.)
Temperature error at 0%: .6%=.12 mm.
Temperature error at 45%: .8%=.29 mm.
Decrease of image size: .17 mm.

To compensate the temperature error, it would be necessary to move the 0% graduation by .12 mm. and the 45% graduation by .29 mm. to match the displacement of the image points 10 and 11, and the .17 mm. shrinkage of the distance between them, caused by a temperature change of 20° F.

Figure 2B:
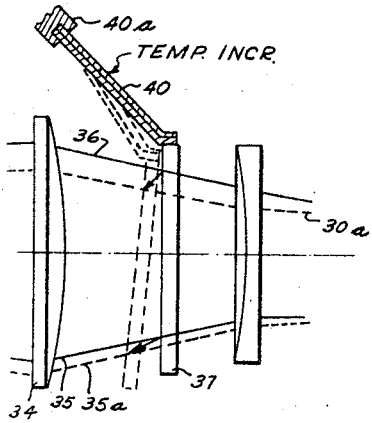
FIGURE 2b shows the action of the compensator used in FIGURE 2a in greater detail.

FIGURE 2b shows that this can be accomplished by providing a bi-metallic blade 40, mounted at 40a, to move the scale 33 toward lens 34 and downward, and rotating it clockwise about an axis normal to the plane of the drawing. Rays 35 and 36 are the chief rays corresponding to 0% and 45% sugar solutions at 70° F., whereas the dotted rays 35a and 36a show the positions of the same chief rays at a temperature of 90° F. If the angle β included between rays 35 and 36 is 37 degrees, tan β/2=.33, and if scale 37 is moved by .3 mm. into a direction forming a 37½° angle with the optical axis and then rotated clockwise by 1 degree about the 45% mark, calculation or graphical solution shows that it will occupy the dotted position, where the spacing between rays 35a and 36a matches the distance between the 0% and 45% scale divisions.

The advantage of this arrangement is that only a small scale motion is required to achieve the desired compensation effect. A bi-metallic blade about 1.4 inches long and ¹⁄₃₂ inch thick would provide the required displacement as well as the 1 degree rotation. Such a blade constitutes a very sturdy actuator. FIGURE 2b illustrates a frictionless actuator assembly that can be used for this purpose.

Figure 3:
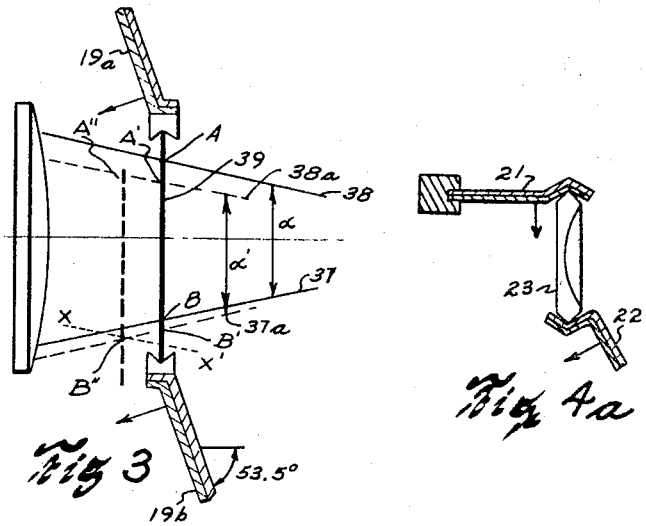
FIGURE 3 illustrates a modification of a scale movement according to the invention.

In the exemplification just described, the scale changes position and orientation. In another possible arrangement, shown in FIGURE 3, a scale 39 is fastened to two identical bi-metallic strips 19a and 19b, arranged at 53.5 degrees to the optical axis. There would be very little, if any, rotation in this arrangement.

Let numerals 37 and 38 represent the position of the 0% and 45% chief rays at 70° F., and 37a, 38a be their respective positions at 90° F. Let B, A and B', A' be their respective points of intersection with scale 39 in its position at 70° F. To find one of the acceptable positions of the scale for 90° F., the line $\overline{XX'}$ should be drawn parallel to ray 38a, at a distance AB measured in a direction parallel to the plane of the scale. The intersection point B'' of line XX' with ray 37a shows the position of the 0% mark of the scale at 90° F., and A'' would then be the position of the 45% mark at 90° F.

Neglecting the change of the aperture angle α of the pattern of chief rays with temperature, which is small, one obtains $\alpha \sim \alpha'$.

The geometry of the figure shows that if $AA'=a$, and $BB'=b$, the transverse component of the scale motion (normal to the optical axis) is:

$$T = \frac{a+b}{2}$$

the longitudinal component (parallel to the optical axis) is:

$$L = \frac{a-b}{2} / \tan \alpha/2$$

the ratio is:

$$L/T \frac{1-b/a}{1+b/a} / \tan \alpha/2$$

Assuming that $b/a > 1.1$, which is true for all refractometers but those of very narrow range, and a $< 90°$, which is dictated by the attainable field lens aperture, explained hereinafter, one obtains in absolute terms:

$$L/T > \frac{.1}{1.1} \times 1 = .09$$

This means that in all but very specialized cases the composite motion of the scale—or of its center, if rotation is also involved—will occur in a direction forming an angle larger than 0.09 radian (5 degrees) with the plane of the scale.

It is evident from the foregoing discussion that only the relative displacement between the various optical elements is important. Temperature compensation may, therefore, also be obtained by raising the objective 9 and the field lens 13, FIGURE 2a, and displacing them longitudinally towards scale 12, which would remain fixed in the casing of the instrument. It would also be possible to separate the functions of compensating for chief ray displacement and chief ray spacing, for instance, by moving the field lens 13 toward the scale 12 to match the chief ray spacing to the 0–45% scale interval, and raising the objective 9 so that the 45% ray will strike the 45% mark. This mode of operation, incidentally, would reduce the longitudinal displacement of the image plane and minimize the defocusing effect discussed further on in this specification.

The important point in all these schemes is that temperature compensation is achieved by generating motion which involves longitudinal displacement between the refractometer scale and a pattern of convergent or divergent chief rays in accordance with temperature changes.

Figure 4A:
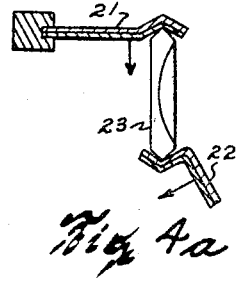
FIGURES 4a and 4b show examples of temperature responsive actuator structures.

To generate the desired compensation effect with the smallest possible scale motion, the chief rays must converge or diverge as strongly as possible. It is well known that for good color correction and flatness of tangential field the aperture stop 20 of the optical system should be located at a distance in front of the objective 9 as shown in FIGURE 2a. This position produces a chief ray pattern of low convergence. The angle formed by the chief rays must, therefore, be increased further on in the light path to the necessary value, perhaps 45° or even 90°, for instance, by using a strongly positive or negative field lens component 13. Total field lens power is then adjusted to the value necessary to provide good eye relief by inserting a balancing component 14 between the scale 12 and eye lens 15. One of the field lens components may also be used as a scale substrate as illustrated in FIGURE 4a.

Figures 4B, 5:
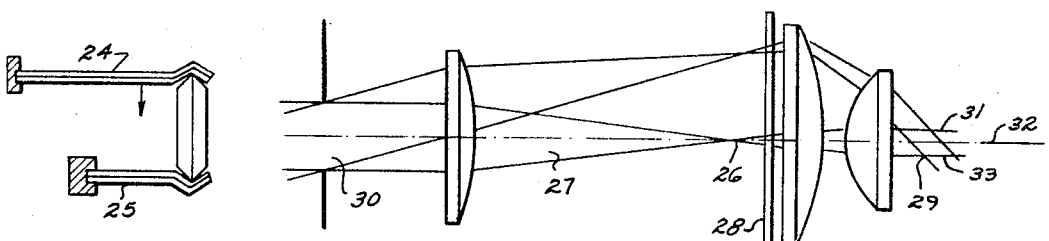
FIGURE 5 illustrates the effect of scale position on parallax in refractometry.

Many other actuator structures are possible. Some are illustrated in FIGURES 4a and 4b. In FIGURE 4a, the actuators 21 and 22 are arranged at an angle to each other, with their orientation to each other, respective lengths and thermal activities calculated to generate the desired tilt of a scale 23. In FIGURE 4b, the same effect is achieved with actuators 24 and 25 which are parallel to each other, but of different length, thickness, and/or flexibility. Many of the well known types of temperature responsive actuators, such as diaphragms, or bellows, controlled by vapor pressure or thermal expansion of liquids, may, of course, be substituted for the bimetallic type shown in the figures.

A point that needs discussion is the problem of maintaining focus in a system in which the distance between the objective lens and the scale is not constant. Referring to FIGURE 5, it is seen that the point of minimum cross-section 26 of light bundle 27 is located in front of a scale 28. If the aperture angle of the bundle of light is substantial as shown, an observer will notice the phenomenon of parallax (a change of reading as the eye moves across the exit pupil), when scanning different portions 31, 32 and 33 of the bundle of light which intersects the scale 28 at different points. Parallax is reduced to a negligible quantity if the exit pupil 29 of the instrument is substantially smaller than the pupil of the observer's eye, and if the distance between the point of minimum cross section 26, and the scale 28 is small. A small exit pupil is undesirable ordinarily, because it reduces the brightness of the optical image. In refractometry, however, only the tangential image is of interest, and parallax may be reduced, therefore, by reducing only the height of the aperture stop 30, and image brightness may be restored by increasing its width: a height to width ratio of ½ or less is therefore advantageous.

In the example given above, using an objective of 50 mm. focal length and a 25 mm. eye lens, the telescope magnification would be about 2, disregarding the effect of the field lens on magnification. If the aperture stop is 1.5 mm. high and 10 mm. wide, the exit pupil will be 0.75 mm. high and 5 mm. wide. If the observer's pupil is assumed to be 5 mm. in diameter, he would have to move his eye by more than 2 mm., up or down from the normal position, before parallax would even begin to appear, that is, through a large distance. The defocusing effect would be negligible. If the aperture ratio of the bundle of light striking the scale is about 1/33 and the maximum scale displacement required to compensate for a 20° F. temperature change is 0.3 mm., the cross section of the bundle of light intersected by the scale would broaden by about .30/33=.01 mm., a negligible amount.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What I claim is:

1. A refractometer for measuring the refractive index of a substance, said refractometer comprising, in combination, a measuring prism having a face exposed to light and for placing thereon a light-transmitting substance to be measured, portions of said light being caused to enter said prism through a substance placed on said face and propagate through said prism at a critical angle of refraction, an objective for receiving and focusing said refracted light at an image plane, a scale adjacent said image plane arranged to intercept said focused light with said focused light appearing as an image on said scale, the position of said image on said scale being indicative of the refractive index of said substance, an eye lens arranged for observation of said image, and temperature-responsive actuator means displacing said image and said scale relative to each other in directions toward and away from said image plane and simultaneously in directions generally parallel to said plane in accordance with changes in temperature of the environment of said substance whereby said indication of refractive index of said substance on said scale is substantially independent of changes in temperature of said substance and said scale may be calibrated to indicate a condition of said substance which is not normally affected by temperature.

2. A refractometer according to claim 1, wherein said actuator means tilts said scale relative to said image plane by amounts varying with said temperature.

3. A refractometer according to claim 1 wherein said refractometer comprises a light refracting member positioned between said scale and said eye lens.

4. A refractometer according to claim 1 wherein said refractometer further comprises an aperture stop intermediate said measuring prism and said objective whose height is less than one-half of its width.

5. A refractometer according to claim 1, wherein said actuator means comprises a bi-metallic member.

6. A refractometer according to claim 1 wherein said actuator means comprises two bi-metal members supporting the scale to move the scale in accordance with temperature changes acting upon said bi-metal members.

7. A refractometer according to claim 6 wherein said two bi-metal members are constructionally different from each other and deform differently in response to environmental temperature changes to cause said movement of the scale.

8. A refractometer for measuring the refractive indices of several substances which have refractive indices different from each other and temperature coefficients of refractive index different from each other, said refractometer comprising, in combination, a measuring prism having a prism face exposed to the ambient light for placing thereon several light-transmitting substances to be measured, light transmitted through each of said substances when placed on said face being caused to enter and propagate through said prism as separate bundles at respectively different critical angles of refraction, an objective for receiving and focusing said refracted bundles of light at an image plane, a scale adjacent said image plane arranged to intercept said focused bundles of light, said focused bundles of light forming an image pattern on said scale indicative of the refractive indices respectively of said substances from which said bundles emanate, an eye lens arranged for observation of said pattern, and temperature-responsive actuator means displacing said pattern and said scale relative to each other in directions toward and away from said image plane and simultaneously in directions generally parallel to said plane in accordance with changes in temperature of the environment of said substance whereby said indication of refractive indices is substantially independent of changes in temperature of said several substances and said scale may be calibrated to indicate a condition of each substance which is not normally affected by temperature.

9. A refractometer according to claim 8 wherein said actuator tilts said scale relative to said image plane by amounts varying with said temperature changes.

10. A refractometer according to claim 8, wherein each of said bundles of light forms an angle of convergence upon leaving said objective, and a refracting member is disposed between said objective and said scale, said refracting member increasing said angle of convergence in absolute terms.

11. A refractometer according to claim 10, wherein said refractometer comprises a second refracting member for opposing the light converging action of said first refracting member, said second refracting member being positioned between said scale and said eye lens.

12. A refractometer according to claim 8, wherein said refractometer comprises an aperture stop intermediate said measuring prism and said objective having a height and a width, the height of the aperture stop being less than one-half of said width.

13. A refractometer according to claim 8, wherein said actuator is a bi-metallic actuator.

14. A refractometer according to claim 8, wherein said actuator comprises two bi-metal strips supporting the scale to move the same so as to alter the angle of interception of said bundle of light with said scale in accordance with temperature changes acting upon the bi-metal strips.

15. A refractometer according to claim 14, wherein said bi-metal strips are two substantially equal strips disposed at an angle in reference to each other, deformation of said strips in response to changes in the ambient temperature causing said movement of the scale.

16. A refractometer according to claim 14, wherein said two bi-metal strips are different from each other, and unequal deformation of said strips in response to changes in the ambient temperature causing said movement of the scale.

References Cited

UNITED STATES PATENTS

| | | |
|---|---|---|
| 2,619,003 | 11/1952 | Polanyi. |
| 3,329,060 | 7/1967 | Holleran _____ 88—14 |
| 3,279,309 | 10/1966 | Goldberg _____ 88—14 |

RONALD L. WIBERT, *Primary Examiner.*

CONRAD CLARK, *Assistant Examiner.*

U.S. Cl. X.R.

350—204